United States Patent
Monyei et al.

(10) Patent No.: US 12,327,263 B1
(45) Date of Patent: Jun. 10, 2025

(54) SYSTEM AND METHOD FOR AN AI ENHANCED SMART GRID FRAMEWORK WITH OPTIMIZED INCENTIVE CAPABILITIES

(71) Applicant: Escrow-Tech Limited, Bristol (GB)

(72) Inventors: Chukwuka Gideon Monyei, Bristol (GB); Jennifer Ifechi Alphonsus, Bristol (GB); Peter Ayokunle Popoola, Durban (ZA); Godspower Ikenna Ogbonna, Ajah (NG); Uduak Christopher Edet, Kubwa (NG); Emmanuel Chibuisi Otuonye, Kubwa (NG); Jesse Nnamdi Abuaja, Avodim Ubakala (NG); Michael Oluwadamilola Obolo, Amsterdam (NL); Chukwuemeka Godwin Monyei, Oxford (GB); Emmanuel Chukwunweike Monyei, Bochum (DE); Uchechukwu Best Olise, Tallinn (EE)

(73) Assignee: ESCROW-TECH LIMITED, Bristol (GB)

(*) Notice: Subject to any disclaimer, the term of this patent is extended or adjusted under 35 U.S.C. 154(b) by 0 days.

(21) Appl. No.: 18/737,927

(22) Filed: Jun. 7, 2024

(51) Int. Cl.
*G06Q 30/00* (2023.01)
*G06Q 30/0207* (2023.01)
(Continued)

(52) U.S. Cl.
CPC .... *G06Q 30/0207* (2013.01); *H02J 13/00002* (2020.01)

(58) Field of Classification Search
CPC .......................... G06Q 30/0207; H02J 13/00002
See application file for complete search history.

(56) References Cited

U.S. PATENT DOCUMENTS

| 2010/0332373 | A1* | 12/2010 | Crabtree | G06Q 40/04 709/224 |
| 2013/0035992 | A1* | 2/2013 | Silverman | G06Q 50/06 705/14.1 |

(Continued)

OTHER PUBLICATIONS

"Artificial Intelligence Enabled Demand Response: Prospects and Challenges in Smart Grid Environment". IEEE. 2023. (Year: 2023).*

(Continued)

*Primary Examiner* — Maria V Vanderhorst
(74) *Attorney, Agent, or Firm* — Galvin Patent Law LLC; Brian R. Galvin

(57) ABSTRACT

A system and method for an AI enhanced smart grid framework with optimized incentive capabilities. The present invention optimizes energy efficiency by generating personalized retrofit plans, optimal energy dispatch schedules, and customized financial incentives. Machine learning algorithms analyze homeowner profiles, energy consumption patterns, and market conditions to recommend tailored energy-saving solutions. The system integrates with funding institutions and aggregators to streamline retrofit financing and carbon credit management. By leveraging AI and ML techniques, this innovative approach aims to accelerate the adoption of energy-efficient technologies, reduce homeowner energy costs, and contribute to a more sustainable energy future.

6 Claims, 11 Drawing Sheets

(51) Int. Cl.
*H02J 13/00* (2006.01)
*G05B 19/418* (2006.01)

(56) References Cited

U.S. PATENT DOCUMENTS

2015/0094968 A1* 4/2015 Jia .......................... G05B 15/02
702/60
2017/0005515 A1* 1/2017 Sanders .................. H02J 3/388

OTHER PUBLICATIONS

"Evaluation of Smart Home Systems and Novel UV-Oriented Solution for Integration, Resilience, Inclusiveness & Sustainability", IEEE. 2022. (Year: 2022).*

* cited by examiner

SYSTEM AND METHOD FOR AN AI ENHANCED SMART GRID FRAMEWORK WITH OPTIMIZED INCENTIVE CAPABILITIES

CROSS-REFERENCE TO RELATED APPLICATIONS

Priority is claimed in the application data sheet to the following patents or patent applications, each of which is expressly incorporated herein by reference in its entirety:
None

BACKGROUND OF THE INVENTION

Field of the Art

The present invention relates to the field of energy conservation and optimization. More specifically, the invention pertains to systems and methods that utilize AI to promote energy conservation while maximizing financial incentives.

Discussion of the State of the Art

Current energy systems face significant challenges in terms of efficiency, sustainability, and affordability. The increasing demand for energy, coupled with the need to reduce greenhouse gas emissions, has led to a growing interest in renewable energy sources and energy-efficient technologies. However, the adoption of these technologies has been hindered by various factors, including high upfront costs, lack of financing options, and limited awareness of their benefits. In the residential sector, homeowners often struggle with high energy bills due to inefficient homes and appliances. Retrofitting homes with energy-efficient upgrades, such as insulation, windows, and heating and cooling systems, can significantly reduce energy consumption and costs. However, the high upfront costs of these retrofits often deter homeowners from making these investments.

To address this issue, various financing options have been developed, such as energy-efficient mortgages, property assessed clean energy (PACE) financing, and on-bill financing. These programs aim to provide homeowners with access to capital for energy-efficient retrofits, which can be repaid through energy savings over time. However, the effectiveness of these programs has been limited by several factors, including strict eligibility requirements, high interest rates, and lack of awareness among homeowners. In addition to financing challenges, the current energy system also faces issues related to grid stability and reliability. The increasing integration of renewable energy sources, such as solar and wind power, has led to greater variability and unpredictability in energy supply. This has created challenges for grid operators, who must balance energy supply and demand in real-time to maintain grid stability.

To address these challenges, there is a growing interest in the use of artificial intelligence (AI) and machine learning (ML) techniques to optimize energy systems. These techniques can be used to analyze large amounts of data from various sources, such as smart meters, weather forecasts, and energy market prices, to make informed decisions about energy production, distribution, and consumption. One area where AI and ML can be particularly useful is in the development of personalized energy plans for homeowners. By analyzing data on a homeowner's energy consumption patterns, home characteristics, and financial situation, AI algorithms can generate customized retrofit recommendations and financing options that are tailored to the homeowner's specific needs and preferences. However, current systems for generating personalized energy plans and financing options have several limitations. They often rely on simple rule-based algorithms that do not take into account the complex interactions between various factors that influence energy consumption and financing decisions. Additionally, these systems often do not provide real-time optimization of energy dispatch and financial incentives based on changing market conditions and homeowner behavior.

To address these limitations, there is a need for a more advanced system that integrates AI and ML techniques to generate optimal retrofit energy plans, dispatch energy efficiently, and provide personalized financial incentives for homeowners. Such a system could help to accelerate the adoption of energy-efficient technologies, reduce energy costs for homeowners, and contribute to the development of a more sustainable and resilient energy system.

SUMMARY OF THE INVENTION

Accordingly, the inventor has conceived and reduced to practice, a system and method for an AI enhanced smart grid framework with optimized incentive capabilities. The present invention relates to an AI-driven system and method for optimizing energy efficiency and financing. The system integrates machine learning algorithms to generate personalized retrofit energy plans, optimal energy dispatch schedules, and customized financial incentives based on homeowner profiles and energy consumption patterns. Key components include a home energy data repository, an energy optimizer for generating retrofit plans, an energy dispatch network for scheduling energy use, a homeowner profile network analyzing various interest factors, and an interest optimizer for calculating optimal incentives. The system collaborates with funding institutions and aggregators to facilitate retrofit financing and carbon credit management. By leveraging AI and ML techniques, this invention aims to accelerate the adoption of energy-efficient technologies, reduce homeowner energy costs, and contribute to a more sustainable energy future.

According to a preferred embodiment, a system for an AI enhanced smart grid framework with optimized incentive capabilities, comprising: a computing device comprising at least a memory and a processor; a plurality of programming instructions that, when operating on the processor, cause the computing device to: collect a plurality of energy consumption data; train an artificial intelligence network using the plurality of energy consumption data; generate a plurality of tailored energy plans which are based on particular properties energy consumption using the artificial intelligence network; and implement the tailored energy plans through a dispatch network, wherein the dispatch network identifies and prioritized optimal dispatch times based on the tailored energy plans and a plurality of dispatch data, is disclosed.

According to another preferred embodiment, a method for an AI enhanced smart grid framework with optimized incentive capabilities, comprising the steps of: collecting a plurality of energy consumption data; training an artificial intelligence network using the plurality of energy consumption data; generating a plurality of tailored energy plans which are based on particular properties energy consumption using the artificial intelligence network; and implementing the tailored energy plans through a dispatch network, wherein the dispatch network identifies and prioritized optimal dispatch times based on the tailored energy plans and a plurality of dispatch data, is disclosed.

According to an aspect of an embodiment, the system further comprises a home owner profile network which receives a plurality of interest factors as inputs and uses a plurality of machine learning algorithms to create a plurality of property owner profiles.

According to an aspect of an embodiment, the system further comprises a machine learning interest optimizer which receives the plurality of property owner profiles as an input and uses a plurality of machine learning algorithms to generate a suggested incentive program, wherein the suggested incentive program is tailored to each property owner based on their corresponding property owner profile

BRIEF DESCRIPTION OF THE DRAWING FIGURES

DETAILED DESCRIPTION OF THE INVENTION

Figure 1:
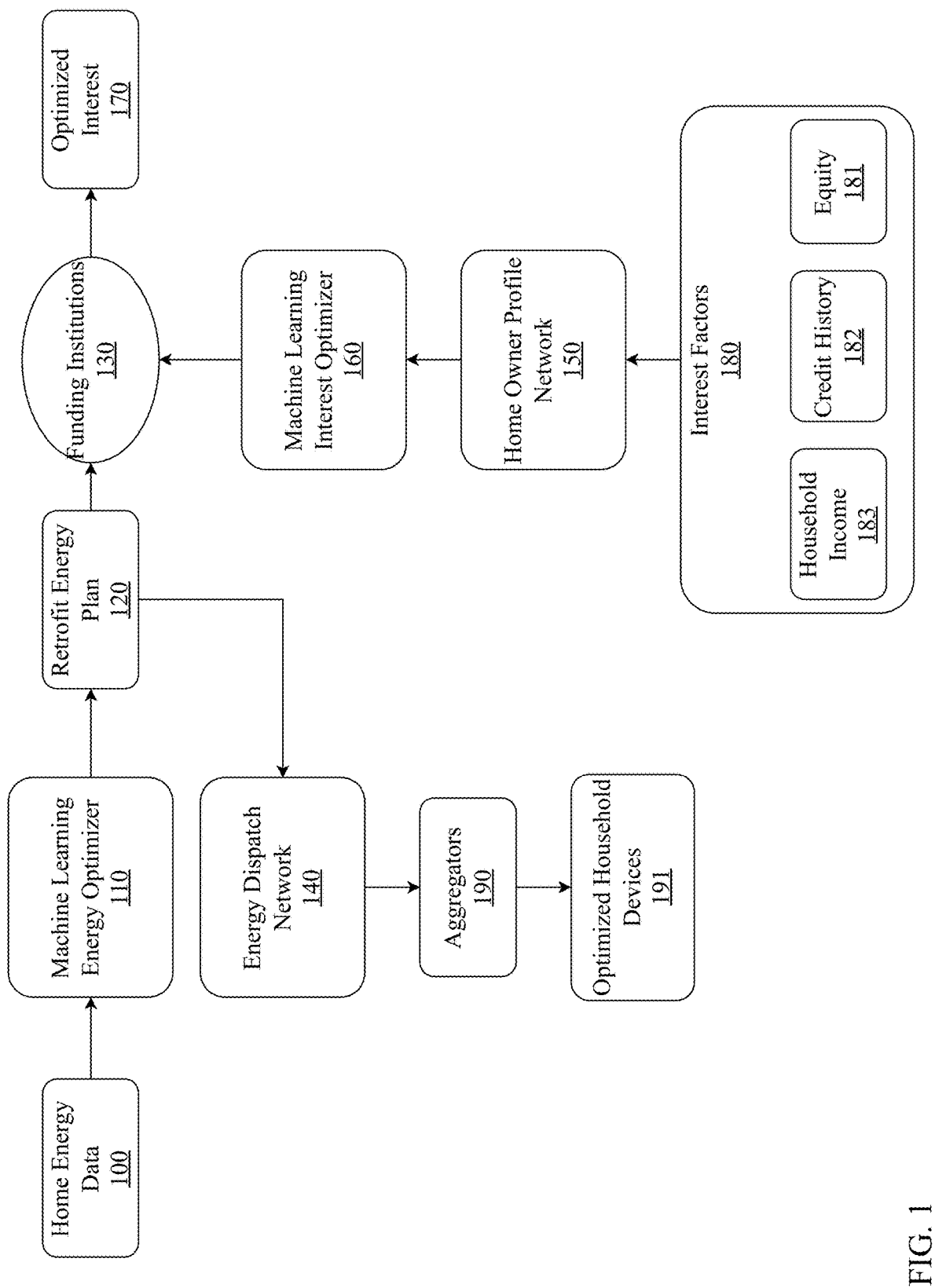
FIG. 1 is a block diagram illustrating an exemplary system architecture for an AI enhanced smart grid framework with optimized incentive capabilities.

The inventor has conceived, and reduced to practice, a system and method a system and method for an AI enhanced smart grid framework with optimized incentive capabilities.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for an AI enhanced smart grid framework with optimized incentive capabilities. The system and method comprise several components that work together to provide a comprehensive solution for improving energy efficiency in homes and facilitating access to financing for retrofit projects.

A home energy data repository 100 serves as a centralized storage for collecting and managing data related to residential energy consumption, homeowner profiles, and retrofit project information. The repository incorporates scalable and secure database systems and data pipelines to ensure data quality and consistency. In one embodiment, the data repository may include cloud storage or local storage.

A machine learning energy optimizer 110 utilizes AI algorithms to analyze the data from the home energy data repository 100 and generates personalized retrofit energy plans 120 for property owners. The energy optimizer 110 may utilize techniques such as decision trees, random forests, and clustering to segment homeowners based on their energy usage profiles and recommend targeted retrofit measures. The optimizer considers factors such as but not limited to home age, size, insulation levels, appliance efficiency, and renewable energy potential to generate comprehensive retrofit plans.

In one embodiment, the machine learning energy optimizer 110 may be implemented as a Convolutional Neural Network (CNN), a deep learning architecture capable of analyzing grid-like data structures such as energy consumption patterns. A CNN is a type of neural network that applies convolutional operations to automatically learn and extract meaningful features from input data. It consists of multiple layers, including convolutional layers, pooling layers, and fully connected layers. The convolutional layers apply a set of learnable filters to the input data, capturing local patterns and spatial dependencies. These filters slide across the input, performing element-wise multiplications and producing feature maps that highlight relevant patterns. Pooling layers downsample the feature maps, reducing their spatial dimensions while retaining the most significant features. This process helps to extract hierarchical representations of the input data, enabling the CNN to learn complex patterns and relationships.

In the context of the machine learning energy optimizer 110, a CNN can be trained on historical energy consumption data, weather patterns, and other relevant features to automatically learn and identify the most informative patterns for generating optimized retrofit energy plans 120. By leveraging the power of CNNs, the energy optimizer can effectively capture intricate dependencies and correlations within the energy data, leading to more accurate and personalized retrofit recommendations for homeowners.

A home owner profile network 150 generates comprehensive profiles of participating homeowners, considering various factors that influence energy consumption and retrofit decision-making. It employs machine learning algorithms to analyze data from multiple sources, including energy consumption data, demographic information, credit history, and property characteristics. The profile network may utilize unsupervised learning techniques, such as clustering and anomaly detection, to segment homeowners into distinct groups based on their energy usage patterns and financial risk profiles.

In one embodiment, the home owner profile network 150 may utilize a generative AI system to create comprehensive and realistic homeowner profiles. Generative AI refers to a class of machine learning models that learn to generate new data samples that closely resemble the training data distribution. These models, such as Generative Adversarial Networks (GANs) and Variational Autoencoders (VAEs), generally consist of two main components: a generator network and a discriminator network. The generator network takes random noise as input and aims to generate synthetic data samples that mimic the real data. The discriminator network, on the other hand, tries to distinguish between the real and generated samples. During training, the generator and discriminator networks engage in a competitive game, where the generator strives to create increasingly realistic samples to fool the discriminator, while the discriminator continuously improves its ability to differentiate between real and fake data. This adversarial training process enables the generative AI system to capture the underlying patterns and distributions of the training data.

The home owner profile network 150 may consider various interest factors 180 to generate comprehensive homeowner profiles. These factors include but are not limited to equity 181, which represents the homeowner's ownership stake in the property; credit history 182, which assesses the homeowner's creditworthiness and financial risk; and household income 183, which provides insights into the homeowner's financial capacity to undertake retrofit projects.

In the context of the home owner profile network 150, a generative AI system can be trained on a diverse dataset of homeowner profiles, including demographic information, energy consumption patterns, financial data, and property characteristics. By learning the complex relationships and dependencies within this data, the generative AI system can create synthetic homeowner profiles that closely resemble real-world property owners. These generated profiles can be used to augment the existing dataset, improve the robustness and diversity of the profiles, and enable more comprehensive analysis and decision-making. Furthermore, the generative AI system can be conditioned on specific attributes, such as income level or property type, allowing for the creation of targeted homeowner profiles that match desired criteria. By leveraging the power of generative AI, the home owner profile network 150 can create realistic and diverse homeowner profiles, enhancing the accuracy and effectiveness of the overall AI-driven system for optimizing residential energy efficiency and retrofit financing.

A machine learning interest optimizer 160 calculates personalized interest rate incentives for homeowners participating in the retrofit financing program. It leverages the homeowner profiles and retrofit energy plans to determine the optimal interest rates that balance the financial risks and rewards for both homeowners and financing institutions. The interest rate optimizer 160 employs supervised learning algorithms and reinforcement learning techniques to predict the likelihood of successful retrofit project completion and adapt to real-world outcomes and feedback.

The system integrates with funding institutions 130 to facilitate the provision of retrofit financing. It includes APIs and secure communication protocols to enable seamless data exchange and transaction processing. The optimized interest rates 170 and retrofit plans are seamlessly incorporated into the financing workflows, streamlining the loan approval and disbursement process.

An energy dispatch network 140 enables the optimization of energy consumption and carbon credit generation through the integration of demand response (DR) programs. It leverages IoT devices, smart meters, and communication protocols to enable real-time monitoring and control of dispatchable loads in homeowners' premises. The dispatch network includes a centralized DR platform that communicates with smart switches and controllers installed at each participating home, allowing homeowners to specify their preferences and opt-in or opt-out of DR programs.

The system also interfaces with aggregators 190 to facilitate the monetization of generated carbon credits. In one embodiment, the system may leverage blockchain technology to ensure the integrity and traceability of carbon credit transactions and utilizes smart contracts to automate the verification and allocation of carbon credits based on the measured energy savings and DR participation of each homeowner. In one embodiment, the aggregators 190 may have access to the output of the energy dispatch network. This output lets aggregators directly interact with a plurality of optimized household devices 191 to implement changes in loads in accordance with the retrofit energy plan or DR programs.

Optimized household devices 191 represent the IoT-enabled devices and appliances that are controlled and optimized by the energy dispatch network 140 to achieve energy savings and participate in DR programs. The system may incorporate robust security measures to protect sensitive homeowner data and ensure compliance with relevant regulations. It includes encryption techniques, access controls, and privacy-preserving techniques, such as data anonymization and differential privacy, to maintain homeowner confidentiality while enabling aggregate analysis and reporting.

Figure 2:
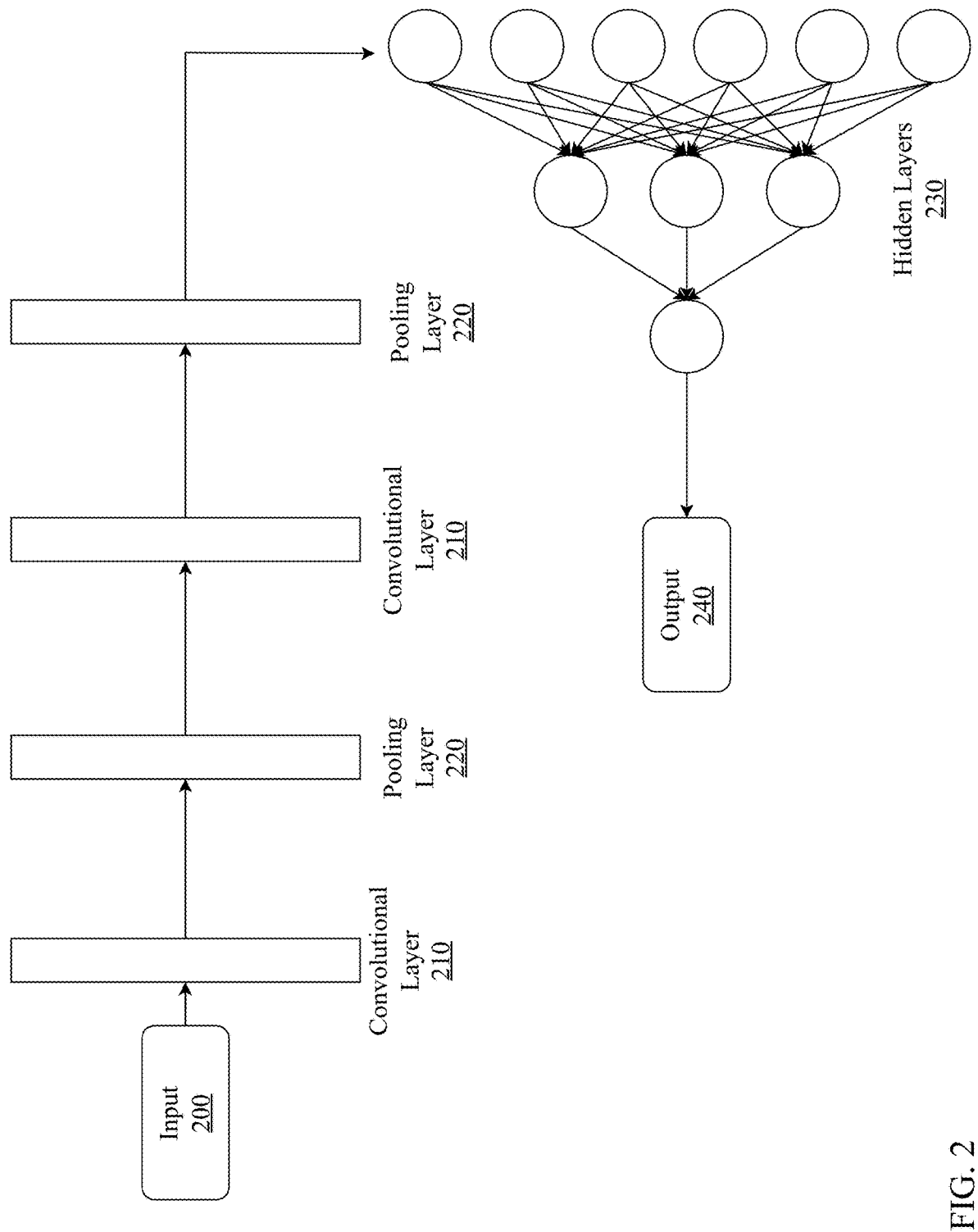
FIG. 2 is a block diagram illustrating a component of a system for an AI enhanced smart grid framework with optimized incentive capabilities, a machine learning energy optimizer, where the optimizer uses a convolutional neural network.

FIG. 2 is a block diagram illustrating a component of a system for an AI enhanced smart grid framework with optimized incentive capabilities, a machine learning energy optimizer, where the optimizer uses a convolutional neural network. The machine learning energy optimizer 110 in one embodiment may implemented as a Convolutional Neural Network (CNN) to effectively analyze and optimize residential energy consumption patterns for generating personalized retrofit energy plans 120. In one embodiment, the CNN architecture consists of multiple layers that work together to learn and extract meaningful features from the input data.

An input layer 200 receives the raw energy consumption data, along with relevant features such as weather patterns, occupancy information, and building characteristics. This input data is typically represented as a grid-like structure, where each element corresponds to a specific energy consumption value or feature at a given time step or spatial location.

The input data is then passed through a series of convolutional layers 210. Each convolutional layer applies a set of learnable filters to the input, performing convolution operations to capture local patterns and spatial dependencies. These filters slide across the input data, computing element-wise multiplications and generating feature maps that highlight relevant patterns and features. The convolutional layers are designed to automatically learn and extract hierarchical representations of the input data, enabling the CNN to identify complex relationships and dependencies within the energy consumption patterns.

After each convolutional layer, a pooling layer 220 may be applied to downsample the feature maps. Pooling layers reduce the spatial dimensions of the feature maps while retaining the most significant features. Common pooling operations include max pooling and average pooling, which select the maximum or average value within a specified window size. Pooling helps to reduce the computational complexity, control overfitting, and provide translation invariance to the learned features.

The CNN architecture may include multiple convolutional and pooling layers stacked together, allowing for the extraction of increasingly abstract and high-level features as the data progresses through the network. The number and size of the convolutional and pooling layers can be adjusted based on the complexity and characteristics of the energy consumption data.

After the convolutional and pooling layers, the extracted features may be flattened and passed through one or more hidden layers 230. These hidden layers are fully connected, meaning that each neuron in a hidden layer is connected to all the neurons in the previous layer. The hidden layers enable the CNN to learn non-linear combinations of the extracted features and capture complex patterns and relationships within the data. An output layer 240 produces the optimized energy consumption predictions or recommendations based on the learned features. The output layer can have different configurations depending on the specific task, such as regression for predicting continuous energy consumption values or classification for categorizing energy efficiency levels.

During the training process, the CNN learns the optimal values for the convolutional filters, pooling parameters, and fully connected weights by minimizing a defined loss function. The loss function measures the discrepancy between the predicted outputs and the actual energy consumption values or desired optimization targets. The CNN iteratively adjusts its parameters using optimization algorithms such as gradient descent and backpropagation to minimize the loss and improve its performance.

Once trained, the CNN-based machine learning energy optimizer 110 can take new, unseen energy consumption data as input and generate optimized predictions or recommendations for retrofit energy plans. The learned filters and weights enable the CNN to effectively capture and analyze the complex patterns and dependencies within the energy data, providing accurate and personalized insights for improving energy efficiency.

Figure 3:
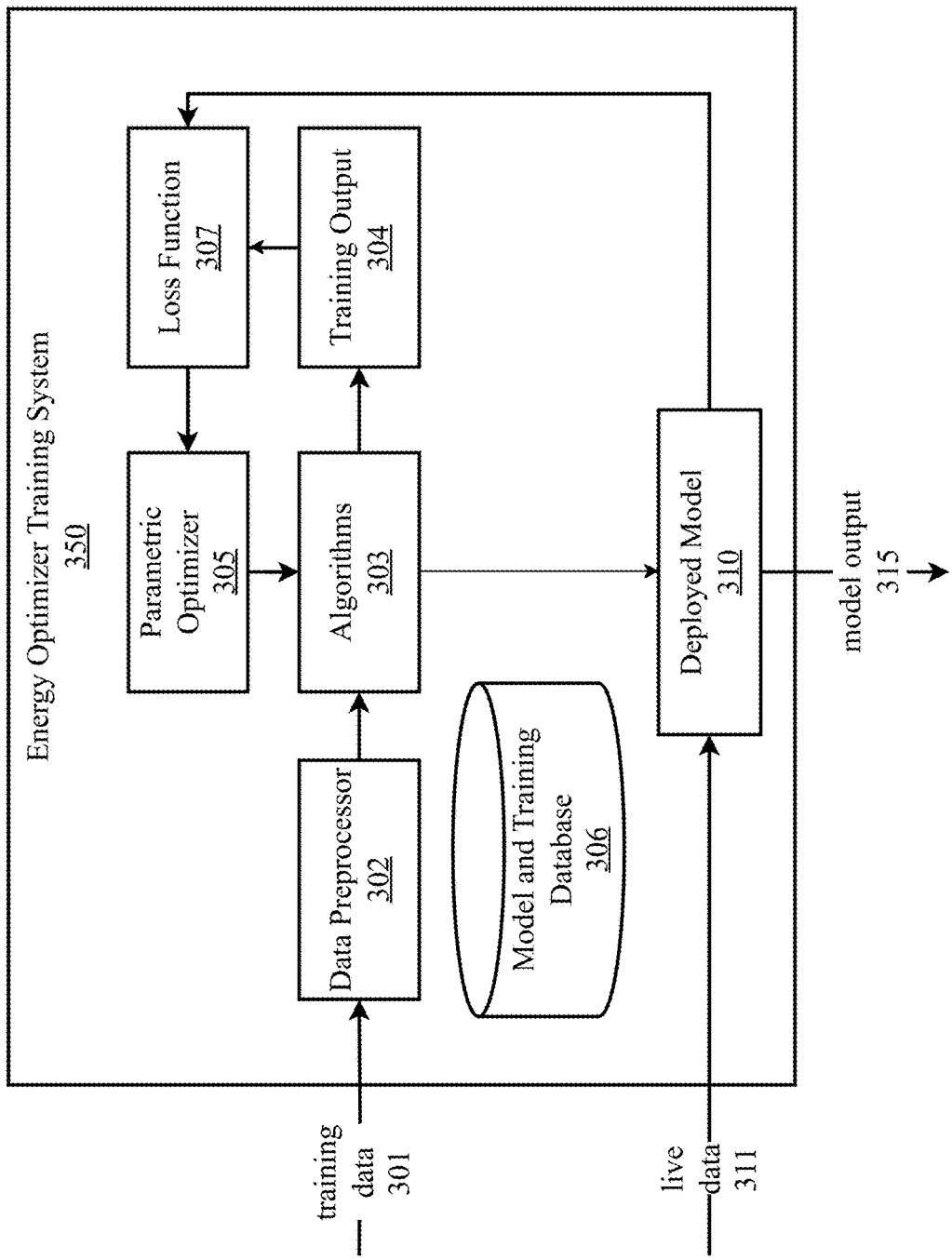
FIG. 3 is a block diagram illustrating a component of a system for an AI enhanced smart grid framework with optimized incentive capabilities, an energy optimizer training system.

FIG. 3 is a block diagram illustrating a component of a system for an AI enhanced smart grid framework with optimized incentive capabilities, an energy optimizer training system. According to the embodiment, the energy optimizer training system 350 may comprise a model training stage comprising a data preprocessor 302, one or more machine and/or deep learning algorithms 303, training output 304, and a parametric optimizer 305, and a model deployment stage comprising a deployed and fully trained model 310 configured to perform tasks described herein such determining correlations between compressed data sets. The energy optimizer training system 350 may be used to train and deploy a machine learning energy optimizer in order to support the services provided by the AI enhanced smart grid framework with optimized incentive capabilities.

At the model training stage, a plurality of training data 301 may be received by the energy optimizer training system 350. Data preprocessor 302 may receive the input data (e.g., household energy data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 302 may also be configured to create training dataset, a validation dataset, and a test set from the plurality of input data 301. For example, a training dataset may comprise 80% of the preprocessed input data, the validation set 10%, and the test dataset may comprise the remaining 10% of the data. The preprocessed training dataset may be fed as input into one or more machine and/or deep learning algorithms 303 to train a predictive model for object monitoring and detection.

During model training, training output 304 is produced and used to measure the accuracy and usefulness of the predictive outputs. During this process a parametric optimizer 305 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tan h, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the energy optimizer training system 350 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 307 to measure the system's performance. The loss function 307 compares the training outputs with an expected output and determined how the algorithm needs to be changed in order to improve the quality of the model output. During the training stage, all outputs may be passed through the loss function 307 on a continuous loop until the algorithms 303 are in a position where they can effectively be incorporated into a deployed model 315.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 310 in a production environment making predictions based on live input data 311 (e.g., household energy data). Further, model correlations and restorations made by deployed model can be used as feedback and applied to model training in the training stage, wherein the model is continuously learning over time using both training data and live data and predictions. A model and training database 306 is present and configured to store training/test datasets and developed models. Database 306 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 303 may comprise a deep learning algorithm such as neural networks (e.g., recurrent, convolutional, long short-term memory networks, etc.).

In some implementations, the energy optimizer training system 350 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 306.

Figure 4:
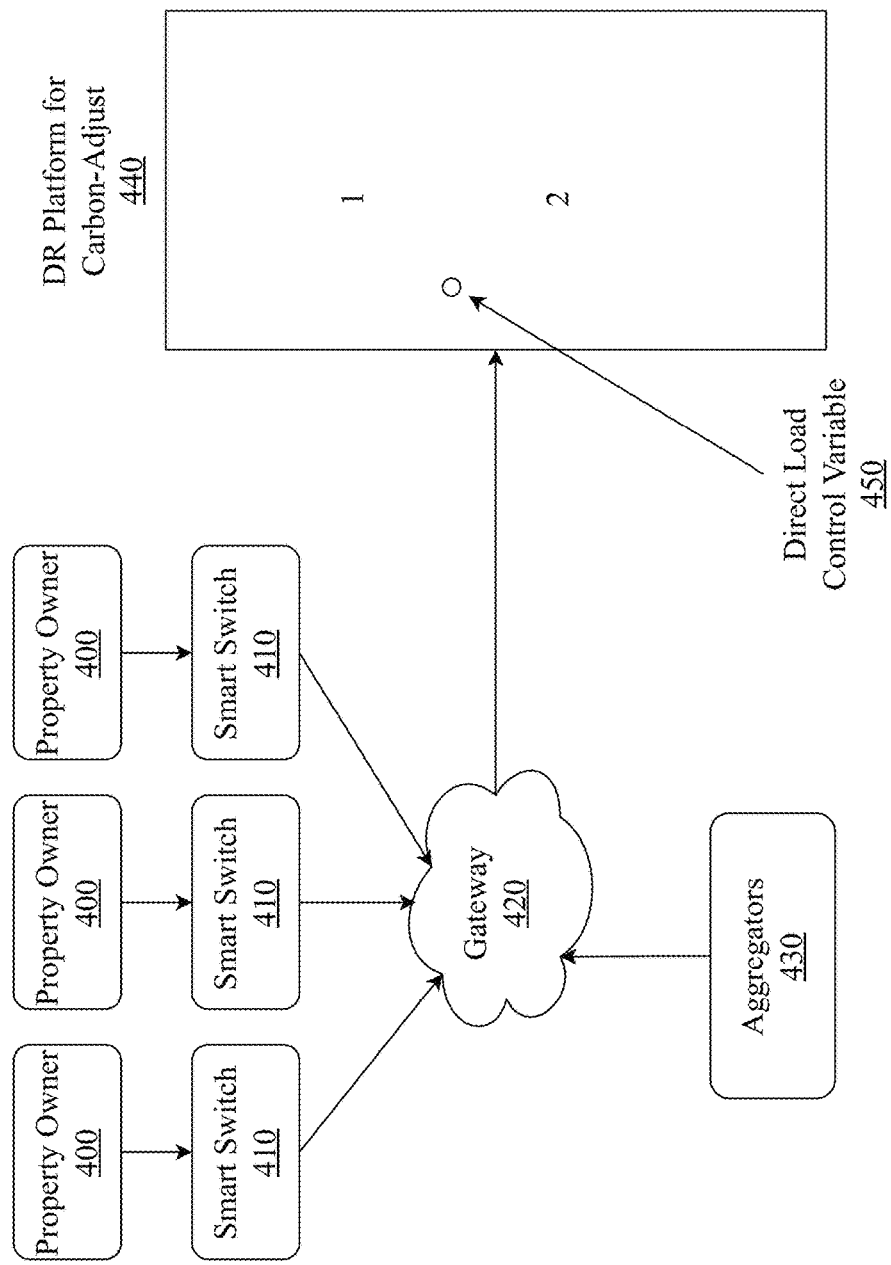
FIG. 4 is a block diagram illustrating an embodiment of a retrofit energy plan which may be used to optimize household devices.

FIG. 4 is a block diagram illustrating an embodiment of a retrofit energy plan which may be used to optimize household devices. In one embodiment, the retrofit energy plan may allow aggregators 430 to directly control energy-consuming devices within a property owner's 400 premises through a network of smart switches 410 and a gateway 420. This system allows for the optimization of energy consumption and participation in Demand Response (DR) programs, as managed by the DR Platform for Carbon-Adjust 440.

Each property owner 400 has one or more smart switches 410 installed in their property. These smart switches 410 are connected to specific energy-consuming devices, such as appliances, heating and cooling systems, or lighting fixtures. The smart switches 410 are capable of monitoring and controlling the energy consumption of the connected devices, as well as communicating with the gateway 420. The gateway 420 serves as a central communication hub that facilitates the exchange of data and control signals between the smart switches 410 and the aggregators 430. It acts as a bridge between the local network of smart switches 410 within the property owner's premises and the external network connecting to the aggregators 430 and the DR Platform for Carbon-Adjust 440.

The aggregators 430 are entities responsible for managing and optimizing the energy consumption across multiple property owners 400. They interact with the DR Platform for Carbon-Adjust 440 to participate in DR programs, which aim to balance energy supply and demand by incentivizing property owners 400 to reduce or shift their energy consumption during peak periods or periods when the carbon intensity of the grid is high. The DR Platform for Carbon-Adjust 440 is a centralized system that coordinates the DR programs and communicates with the aggregators 430. It analyzes various factors such as energy demand, supply, pricing, grid carbon intensity, and grid stability to determine the optimal times and strategies for implementing DR events. A direct load control variable 450 enables the direct control of devices by the aggregators 430. This variable represents a threshold or set of conditions that determine whether the aggregators 430 have the authority to control the energy-consuming devices connected to the smart switches 410.

When the direct load control variable 450 is at a certain threshold, as determined by the DR Platform for Carbon-Adjust 440, the aggregators 430 are granted the ability to directly control the devices within a time window specified by property owner. In this scenario, the aggregators 430 can send control signals through the gateway 420 to the smart switches 410, instructing them to turn devices on or off, adjust their settings, or modify their energy consumption patterns. This direct control allows the aggregators 430 to optimize energy usage across multiple properties and participate effectively in DR programs. On the other hand, when the direct load control variable 450 is not at the specified threshold, the control of the devices remains with the property owners 400. In this case, the property owners 400 have the flexibility to manage their energy consumption according to their preferences and needs. They can interact with the smart switches 410 directly or through a user interface provided by the gateway 420 to control their devices.

The system operates dynamically, with the direct load control variable 450 being continuously monitored and updated based on the conditions and requirements set by the DR Platform for Carbon-Adjust 440. This allows for a seamless transition of control between the aggregators 430 and the property owners 400, depending on the current energy demand and supply situation. By leveraging this system, the aggregators 430 can effectively manage and optimize energy consumption across multiple properties, while still providing property owners 400 with the flexibility to control their devices when the direct load control variable 450 allows. This collaborative approach enables the implementation of successful DR programs, leading to reduced energy costs, improved grid stability, and the generation of carbon credits that can be monetized through the Carbon-Adjust platform.

Figure 5:
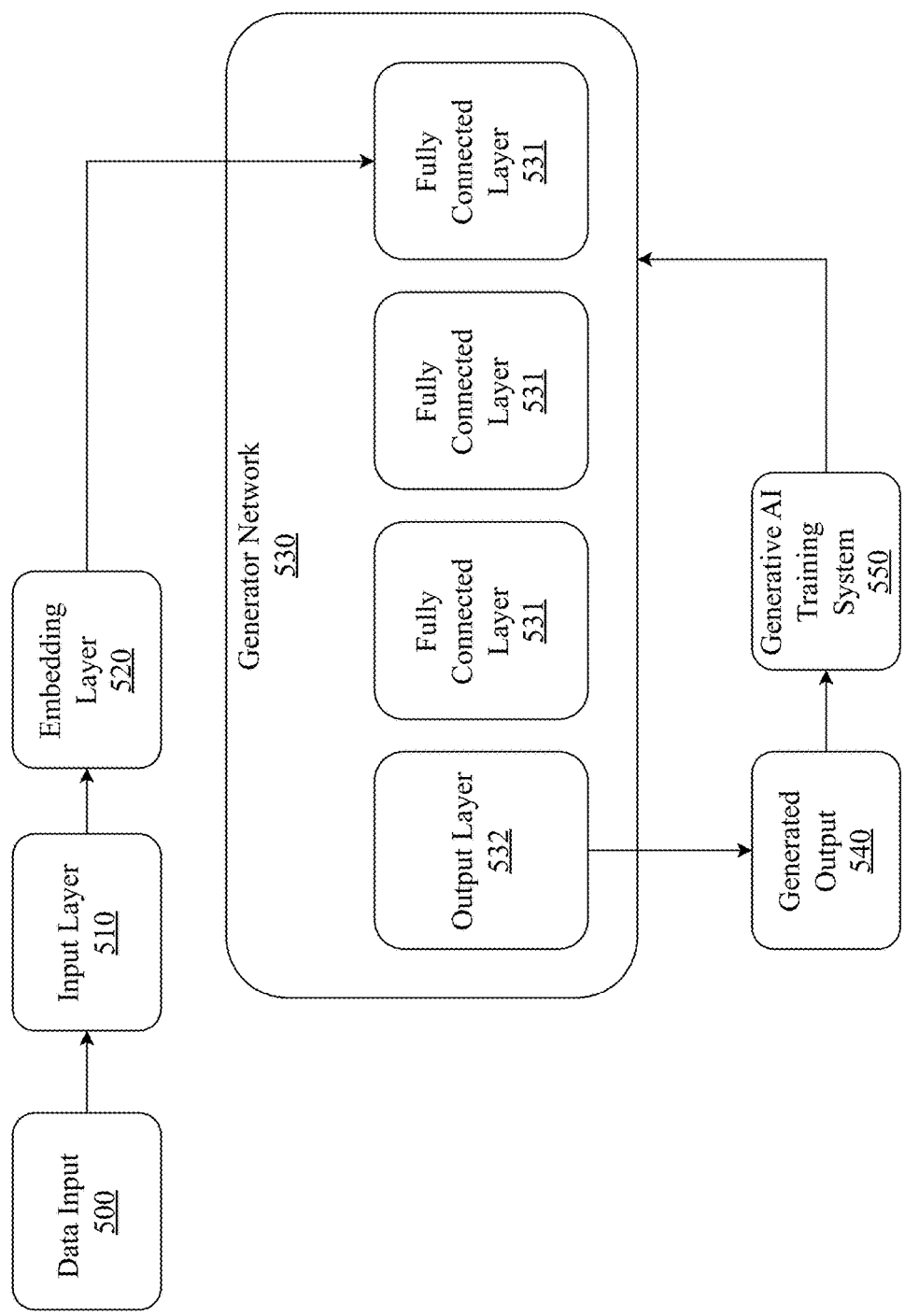
FIG. 5 is a block diagram illustrating a component of a system for an AI enhanced smart grid framework with optimized incentive capabilities, a home owner profile network, where the home owner profile network uses a generative AI system.

FIG. 5 is a block diagram illustrating a component of a system for an AI enhanced smart grid framework with optimized incentive capabilities, a home owner profile network, where the home owner profile network uses a generative AI system. In one embodiment, the home owner profile network 150 is implemented using a generative AI system. This generative AI system is designed to create realistic and diverse homeowner profiles by learning from a large dataset of existing profiles. The generative AI system may comprise several components, including but not limited to an input layer 510, an embedding layer 520, a generator network 530, and a generative AI training system 550.

A data input 500, represents the raw data used to train the generative AI system. This data includes a wide range of information related to homeowners, such as demographic details, energy consumption patterns, financial data, property characteristics, and more. The data is collected from various sources and preprocessed to ensure quality and consistency. The input layer 510 receives the preprocessed data and performs any necessary transformations or normalizations. This layer is responsible for preparing the data in a suitable format for the subsequent layers of the generative AI system. The embedding layer 520 learns to map the input data into a lower-dimensional representation known as embeddings. Embeddings capture the semantic and contextual relationships between different features of the homeowner profiles. The embedding layer 520 learns these dense vector representations through techniques including but not limited to word embeddings or entity embeddings, depending on the nature of the input data. By representing the data in a compact and meaningful way, the embedding layer 520 enables the generative AI system to effectively learn and generate realistic homeowner profiles.

The generator network 530 comprises multiple layers of interconnected nodes that learn to generate synthetic homeowner profiles. The generator network 530 takes the embeddings from the embedding layer 520 as input and processes them through a series of fully connected layers 531. Each fully connected layer 531 applies a linear transformation followed by a non-linear activation function, allowing the network to learn complex patterns and relationships within the data.

The fully connected layers 531 are stacked to form a deep neural network architecture. As the data flows through these layers, the generator network 530 learns to capture the underlying distributions and characteristics of the real homeowner profiles. It learns to generate synthetic profiles that closely resemble the real data by adjusting the weights and biases of the connections between the nodes. The output layer 532 produces the generated output 540, which represents the synthetic homeowner profiles created by the generative AI system. The output layer 532 applies appropriate activation functions and transformations to ensure that the generated profiles have the desired format and properties.

The generative AI training system 550 is responsible for training the generator network 530 using advanced machine learning techniques. The training process aims to minimize the difference between the generated profiles and the real profiles by adjusting the parameters of the generator network 530 iteratively.

One possible approach used in generative AI training is the Generative Adversarial Network (GAN) framework. In a GAN, the generator network 530 is trained in conjunction with a discriminator network. The discriminator network learns to distinguish between real and generated profiles, providing feedback to the generator network 530 to improve its ability to generate realistic profiles. The training process involves a competitive game between the generator and discriminator networks, where the generator aims to fool the discriminator by generating increasingly realistic profiles, while the discriminator strives to accurately identify the generated profiles. Through the iterative training process, the generator network 530 learns to capture the intricate patterns, dependencies, and variations present in the real homeowner profiles. It becomes capable of generating synthetic profiles that closely resemble the real data, preserving the statistical properties and relationships. Once trained, the generator network 530 can be used to generate a large number of diverse and realistic homeowner profiles. These generated profiles can serve various purposes within the AI-driven system for optimizing residential energy efficiency and retrofit financing. They can be used to augment the existing dataset, enabling the system to learn from a wider range of scenarios and improve its performance. The generated profiles can also be utilized for testing and validating other components of the system, such as the machine learning energy optimizer 110 and the machine learning interest optimizer 160.

Furthermore, the generative AI system allows for the creation of targeted homeowner profiles based on specific criteria or conditions. By providing desired attributes or constraints as input to the generator network 530, it can generate profiles that match those specifications. This capability is particularly valuable for scenario analysis, market segmentation, and targeted marketing strategies.

Figure 6:
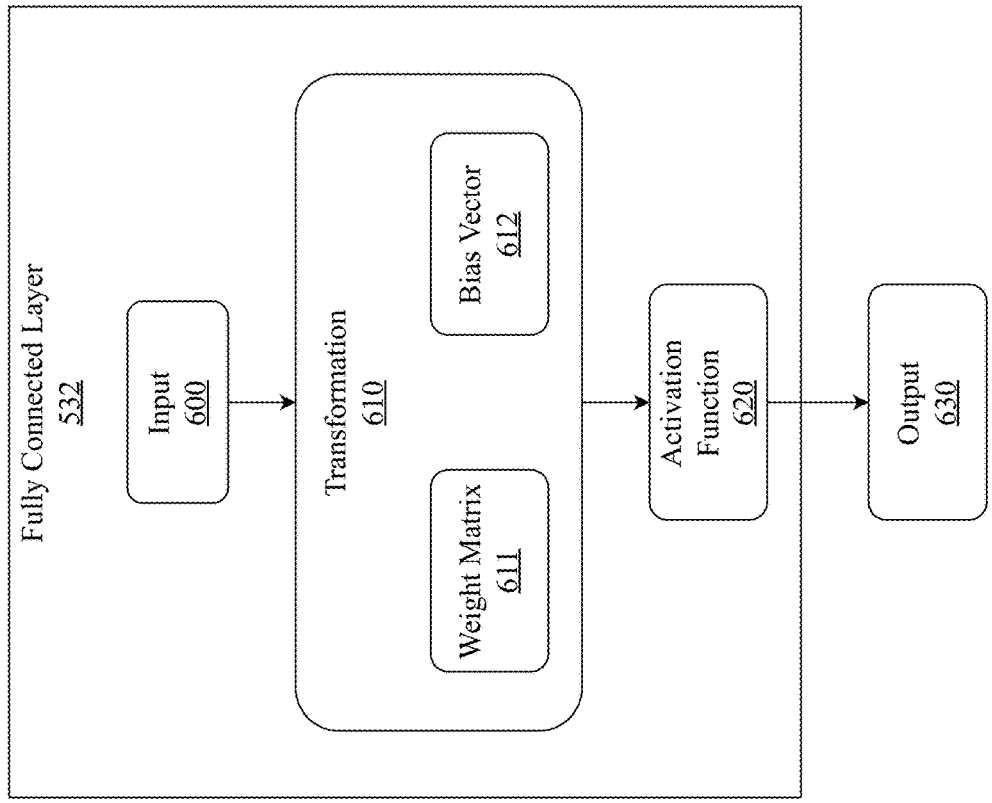
FIG. 6 is a block diagram illustrating a component of a generative AI system, a fully connected layer.

FIG. 6 is a block diagram illustrating a component of a generative AI system, a fully connected layer. A fully connected layer 532 comprises several elements that work together to process and transform the input data, enabling the generation of realistic and diverse profiles. An input 600, represents the data coming from the previous layer of the generator network 530. This input data has already been processed and transformed by the preceding layers, such as the embedding layer 520 and other fully connected layers 531. The input 600 is typically a high-dimensional vector that captures the relevant features and representations of the homeowner profiles.

A transformation 610 is the core operation performed by the fully connected layer 532. It involves a linear transformation of the input 600 using learnable parameters called a weight matrix 611 and a bias vector 612. The weight matrix 611 is a 2D array that contains the weights associated with each connection between the input nodes and the output nodes of the layer. These weights determine the strength and importance of each input feature in contributing to the output of the layer. The bias vector 612 is a 1D array that introduces an additional degree of freedom to the transformation, allowing the layer to learn more complex representations.

During the transformation 610, each input value is multiplied by its corresponding weight in the weight matrix 611, and the results are summed up. The bias vector 612 is then added to this weighted sum, producing the intermediate output of the Transformation 610.

After the transformation 610, the intermediate output is passed through an activation function 620. The activation function 620 introduces non-linearity into the layer, enabling the generator network 530 to learn and represent complex patterns and relationships in the data. The choice of the activation function 620 depends on the specific requirements of the generative AI system and the nature of the homeowner profiles being generated. Some possible activation functions include but are not limited to, ReLU (Rectified Linear Unit), Sigmoid, Tan h (Hyperbolic Tangent), and Leaky ReLU. An embodiment may use a plurality of different activation functions to achieve the specific goal of the generative AI system.

The activation function 620 is applied element-wise to the intermediate output of the transformation 610, producing a final output 630 of the fully connected layer 532. The output 630 represents the transformed and activated representation of the input data, capturing higher-level features and abstractions relevant to the homeowner profiles.

The dimensions of the output 630 depend on the number of nodes in the fully connected layer 532, which is a hyperparameter that can be adjusted based on the complexity and requirements of the generative AI system. Increasing the number of nodes allows the layer to learn more complex representations, while decreasing the number of nodes can help in reducing overfitting and improving generalization.

During the training process, the weight matrix 611 and bias vector 612 may be learned and optimized using backpropagation and gradient descent algorithms. The goal is to minimize the difference between the generated homeowner profiles and the real profiles in the training dataset. The gradients of the loss function with respect to the weights and biases are computed, and the parameters are updated iteratively to improve the quality and realism of the generated profiles.

Once trained, the fully connected layer 532 becomes an integral part of the Generator Network 530, enabling it to generate synthetic homeowner profiles that closely resemble real-world data. The learned weights and biases capture the complex patterns, dependencies, and variations present in the real profiles, allowing the generator network 530 to create diverse and realistic profiles.

Figure 7:
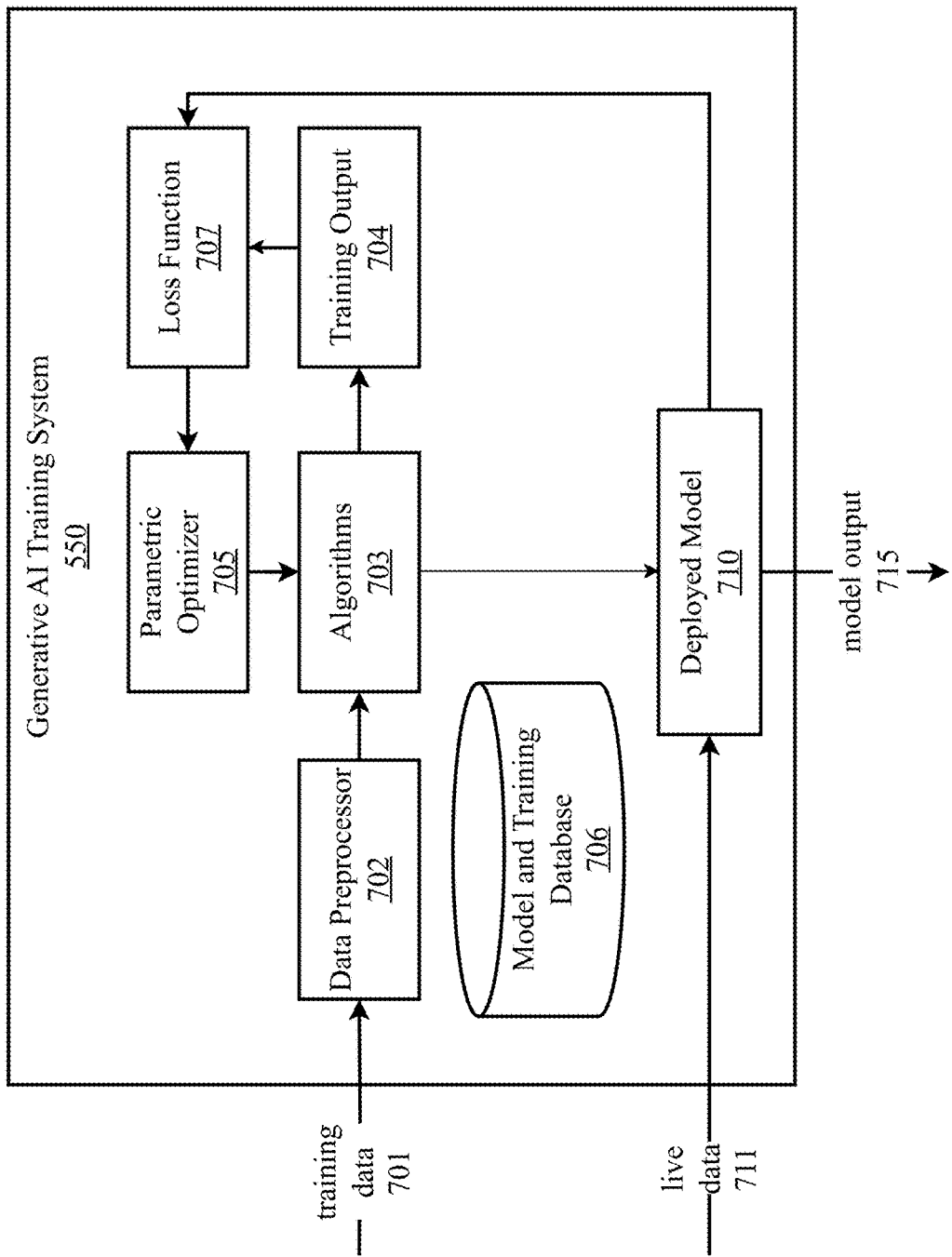
FIG. 7 is a block diagram illustrating a component of a system for an AI enhanced smart grid framework with optimized incentive capabilities, a generative AI training system.

FIG. 7 is a block diagram illustrating a component of a system for an AI enhanced smart grid framework with optimized incentive capabilities, a generative AI training system. According to the embodiment, the generative AI training system 550 may comprise a model training stage comprising a data preprocessor 702, one or more machine and/or deep learning algorithms 703, training output 704, and a parametric optimizer 705, and a model deployment stage comprising a deployed and fully trained model 710 configured to perform tasks described herein such determining correlations between compressed data sets. The correlation network training system 770 may be used to train and deploy a plurality of generative AI training systems in order to support the services provided by the AI enhanced smart grid framework with optimized incentive capabilities.

At the model training stage, a plurality of training data 701 may be received by the generative AI training system 750. Data preprocessor 702 may receive the input data (e.g., interest factor data, incentive data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 702 may also be configured to create training dataset, a validation dataset, and a test set from the plurality of input data 701. For example, a training dataset may comprise 80% of the preprocessed input data, the validation set 10%, and the test dataset may comprise the remaining 10% of the data. The preprocessed training dataset may be fed as input into one or more machine and/or deep learning algorithms 703 to train a predictive model for object monitoring and detection.

During model training, training output 704 is produced and used to measure the accuracy and usefulness of the predictive outputs. During this process a parametric optimizer 705 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tan h, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the generative AI training system 550 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 707 to measure the system's performance. The loss function 707 compares the training outputs with an expected output and determined how the algorithm needs to be changed in order to improve the quality of the model output. During the training stage, all outputs may be passed through the loss function 707 on a continuous loop until the algorithms 703 are in a position where they can effectively be incorporated into a deployed model 715.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 710 in a production environment making predictions based on live input data 711 (e.g., interest factor data, incentive data). Further, model correlations and restorations made by deployed model can be used as feedback and applied to model training in the training stage, wherein the model is continuously learning over time using both training data and live data and predictions. A model and training database 706 is present and configured to store training/test datasets and developed models. Database 706 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 703 may comprise a deep learning algorithm such as neural networks (e.g., recurrent, convolutional, long short-term memory networks, etc.).

In some implementations, the generative AI training system 550 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 706.

Detailed Description of Exemplary Aspects

Figure 8:
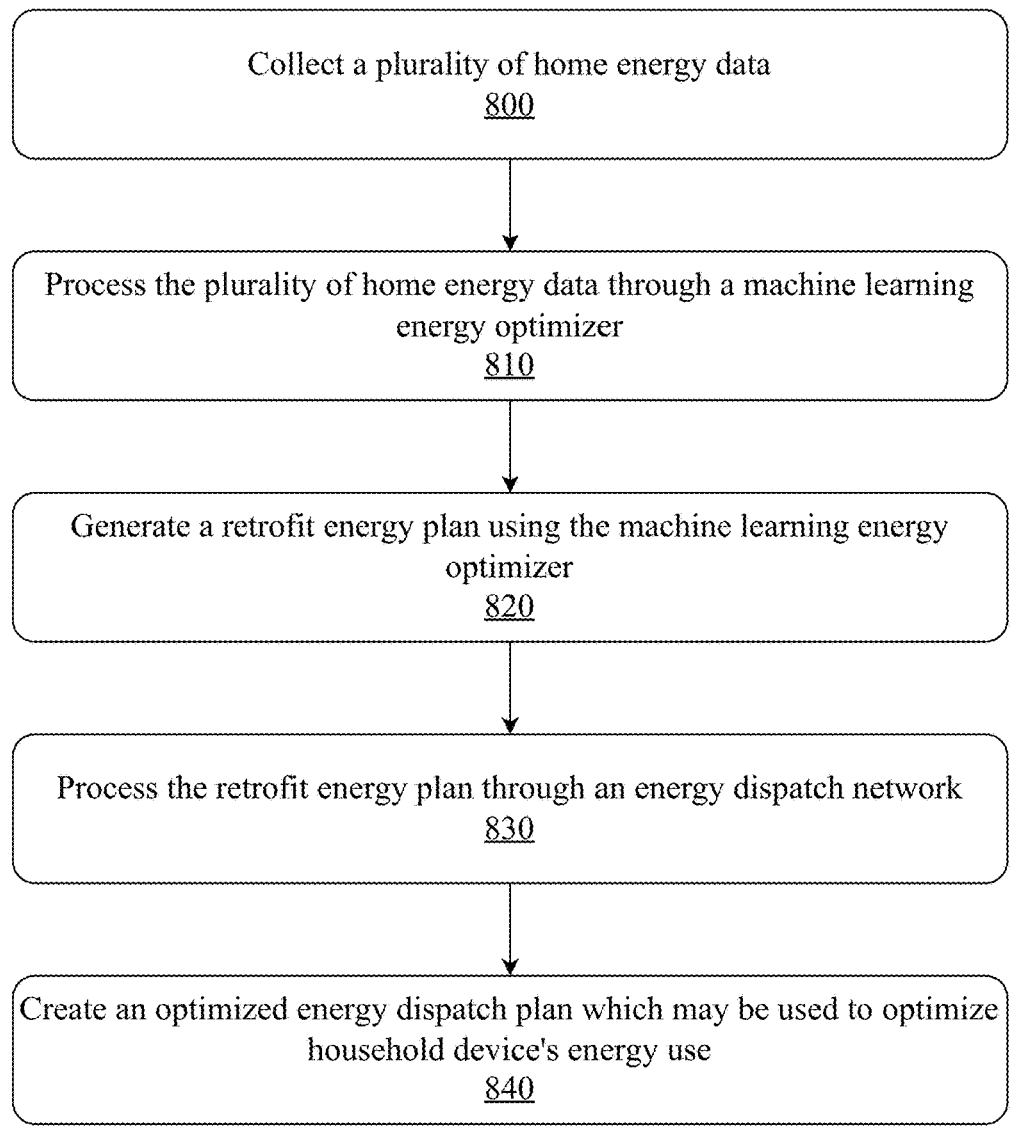
FIG. 8 is a flow diagram illustrating an exemplary method for creating optimized energy dispatch plans to optimize household device energy use.

FIG. 8 is a flow diagram illustrating an exemplary method for creating optimized energy dispatch plans to optimize household device energy use. In a first step 800, collect a plurality of home energy data. This data can be gathered from various sources, including smart meters, IoT devices, home energy management systems, and utility companies. The collected data may include information such as energy consumption patterns, appliance usage, occupancy schedules, weather data, and home characteristics. The data is preprocessed and normalized to ensure consistency and quality for further analysis.

In a step 810, the collected home energy data is processed through a machine learning energy optimizer. The machine learning energy optimizer can be implemented using various machine learning algorithms and architectures. In one embodiment, the energy optimizer utilizes a Convolutional Neural Network (CNN) to analyze the energy data and extract meaningful features and patterns. The CNN architecture, as described in previous figures, consists of multiple layers, including convolutional layers, pooling layers, and fully connected layers. The convolutional layers apply learnable filters to the input data, capturing local patterns and spatial dependencies. The pooling layers downsample the feature maps, reducing the spatial dimensions while retaining the most significant features. The fully connected layers learn non-linear combinations of the extracted features and capture complex patterns and relationships within the data.

During the training process, the CNN learns to identify energy consumption patterns, detect inefficiencies, and predict potential energy-saving opportunities. It leverages techniques such as data augmentation, regularization, and hyperparameter tuning to improve its performance and generalization capabilities.

In a step 820, the machine learning energy optimizer generates a personalized retrofit energy plan for each household. The retrofit energy plan provides recommendations for energy-efficient upgrades, behavioral changes, and operational optimizations based on the specific characteristics and energy consumption patterns of the household. The plan may include suggestions such as upgrading to energy-efficient appliances, improving insulation, installing smart thermostats, or adopting energy-saving practices.

In a step 830, the generated retrofit energy plan is then processed through an energy dispatch network. The energy dispatch network is responsible for optimizing the scheduling and control of household devices to maximize energy efficiency and minimize costs. It takes into account various factors such as energy prices, grid conditions, renewable energy availability, carbon intensity of grid, and user preferences. The energy dispatch network can be implemented using advanced optimization algorithms and machine learning techniques. It may leverage reinforcement learning to learn optimal control policies for household devices based on real-time feedback and historical data. The dispatch network continuously adapts and improves its strategies to ensure efficient energy utilization and cost savings.

In a step 840, the energy dispatch network creates an optimized energy dispatch plan. The optimized plan determines the optimal operating schedules and settings for household devices, considering factors such as peak demand periods, time-of-use tariffs, grid carbon intensity, and renewable energy generation. It aims to minimize energy waste, reduce costs, reduce associated carbon footprint of dispatch schedule, and maximize the use of clean energy sources.

The optimized energy dispatch plan can be executed through smart home devices, IoT platforms, and home energy management systems. It enables automated control and scheduling of appliances, heating and cooling systems, and other energy-consuming devices. Homeowners can monitor and manage their energy consumption through user-friendly interfaces and receive real-time feedback and recommendations.

Moreover, the optimized energy dispatch plans contribute to grid stability and the integration of renewable energy sources. By intelligently scheduling and controlling household devices, the method helps in load balancing, peak demand reduction, carbon footprint reduction, and the efficient utilization of clean energy resources. This, in turn, supports the transition towards a more sustainable and low-carbon energy future. The method can be further enhanced by incorporating additional data sources, such as weather forecasts, occupancy patterns, and user feedback, to refine the energy optimization models and improve the accuracy of the generated plans. Continuous monitoring and analysis of energy consumption data enable the system to adapt and evolve over time, providing increasingly personalized and effective energy-saving recommendations.

Figure 9:
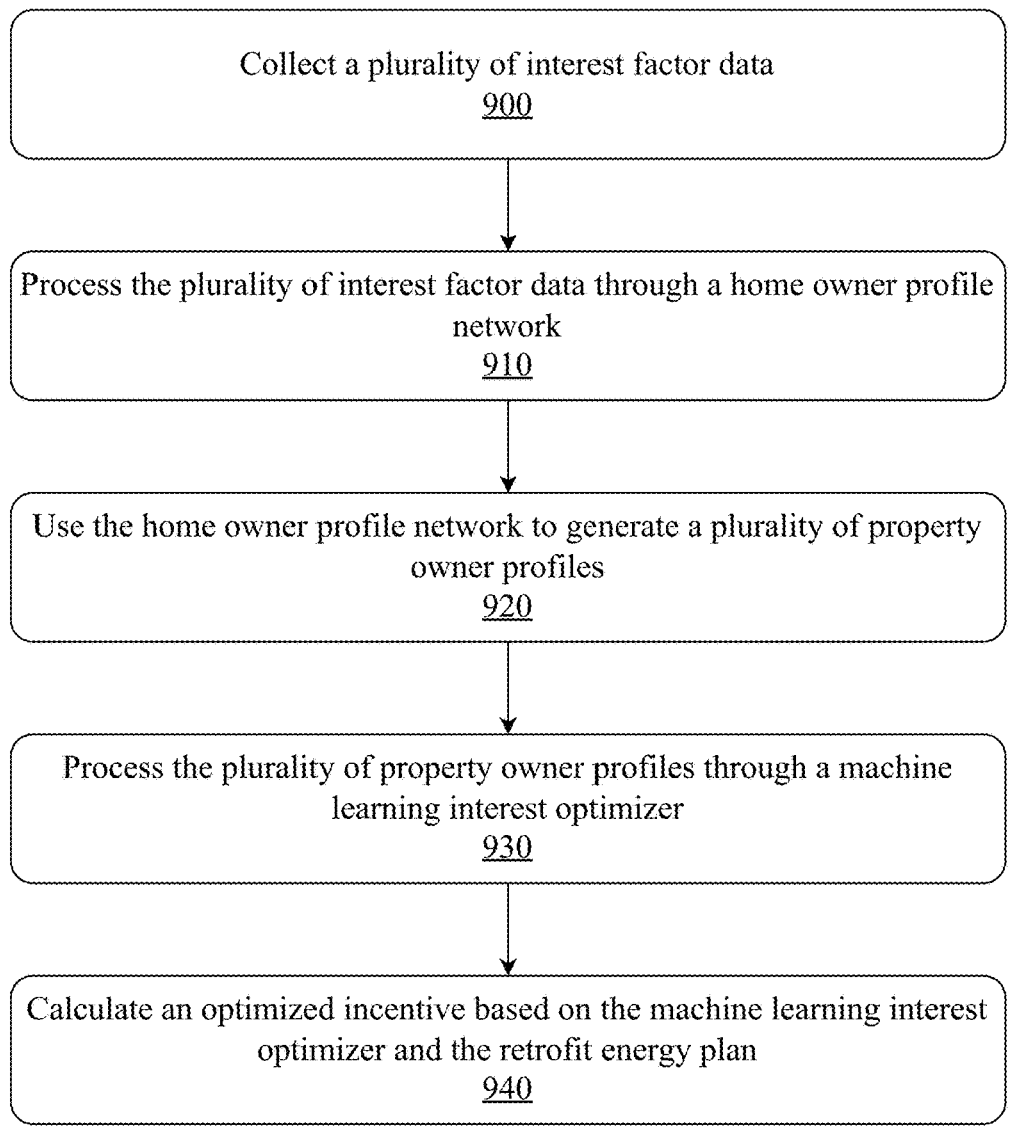
FIG. 9 is a flow diagram illustrating an exemplary method for calculating an optimize incentive based on the machine learning optimizer output and the retrofit energy plan.

FIG. 9 is a flow diagram illustrating an exemplary method for calculating an optimized incentive based on the machine learning optimizer output and the retrofit energy plan. In a first step 900, collect a plurality of interest factor data. Interest factor data refers to a wide range of information that influences a property owner's decision-making process regarding energy-efficient retrofits and financing options. This data may include demographic information, property characteristics, energy consumption patterns, credit history, financial data, and environmental preferences. The data is gathered from various sources, such as public records, credit bureaus, energy utilities, and property owner surveys. The collected data is preprocessed and cleaned to ensure data quality and consistency.

In a step 910, the collected interest factor data is processed through a home owner profile network. The home owner profile network can be implemented using advanced machine learning algorithms and architectures. In one embodiment, the home owner profile network utilizes a generative AI system to create realistic and diverse property owner profiles.

The generative AI system, as described in previous figures, consists of an input layer, an embedding layer, a generator network, and a training system. The input layer receives the preprocessed interest factor data and performs any necessary transformations. The embedding layer maps the input data into a lower-dimensional representation, capturing the semantic and contextual relationships between different features. The generator network, which includes multiple fully connected layers, learns to generate synthetic property owner profiles that closely resemble real-world data.

During the training process, the generative AI system learns to capture the complex patterns, dependencies, and variations present in the real property owner data. It employs techniques such as adversarial learning, where a discriminator network is used to provide feedback and improve the quality of the generated profiles. The training system optimizes the parameters of the generator network to minimize the difference between the generated profiles and the real profiles.

In a step 920, the home owner profile network is used to generate a plurality of property owner profiles. These profiles provide a comprehensive representation of each property owner, incorporating various interest factors and preferences. The generated profiles capture the diversity and heterogeneity of the property owner population, enabling personalized and targeted incentive calculations.

In a step 930, the generated property owner profiles are then processed through a machine learning interest optimizer. The interest optimizer is responsible for determining the most effective incentives for each property owner based on their specific profile and the retrofit energy plan generated by the machine learning energy optimizer. The machine learning interest optimizer can be implemented using various supervised learning algorithms, such as decision trees, random forests, or gradient boosting machines. It takes the property owner profiles and the retrofit energy plan as input and learns to predict the likelihood of a property owner accepting and implementing the recommended energy-efficient upgrades.

During the training process, the interest optimizer learns from historical data on successful retrofit projects, incentive acceptance rates, and property owner feedback. It identifies the key factors that influence property owners' decisions and learns to optimize the incentives accordingly. The optimizer may consider factors such as the upfront cost of the retrofits, the projected energy savings, the property owner's financial capacity, and the environmental benefits.

In a step 940, an optimized incentive is calculated based on the machine learning interest optimizer and the retrofit energy plan. The optimized incentive is tailored to each property owner's profile and designed to maximize the likelihood of their participation in the energy-efficient retrofit program. The incentive may include financial rewards, such as reduced interest rates, grants, or tax credits, as well as non-financial incentives, such as enhanced property value, improved comfort, and environmental stewardship recognition.

The method helps financial institutions and energy efficiency program administrators to allocate resources more efficiently and maximize the impact of their incentive budgets. By understanding the specific needs and preferences of each property owner, they can design and offer incentives that are more likely to be accepted and lead to successful retrofit projects. Additionally, method can be further enhanced by incorporating additional data sources, such as real-time energy consumption data, market trends, and policy changes, to refine the property owner profiles and adapt the incentive calculations dynamically. Continuous monitoring and analysis of property owner behavior and retrofit outcomes enable the system to learn and improve over time, providing increasingly accurate and effective incentive recommendations.

Figure 10:
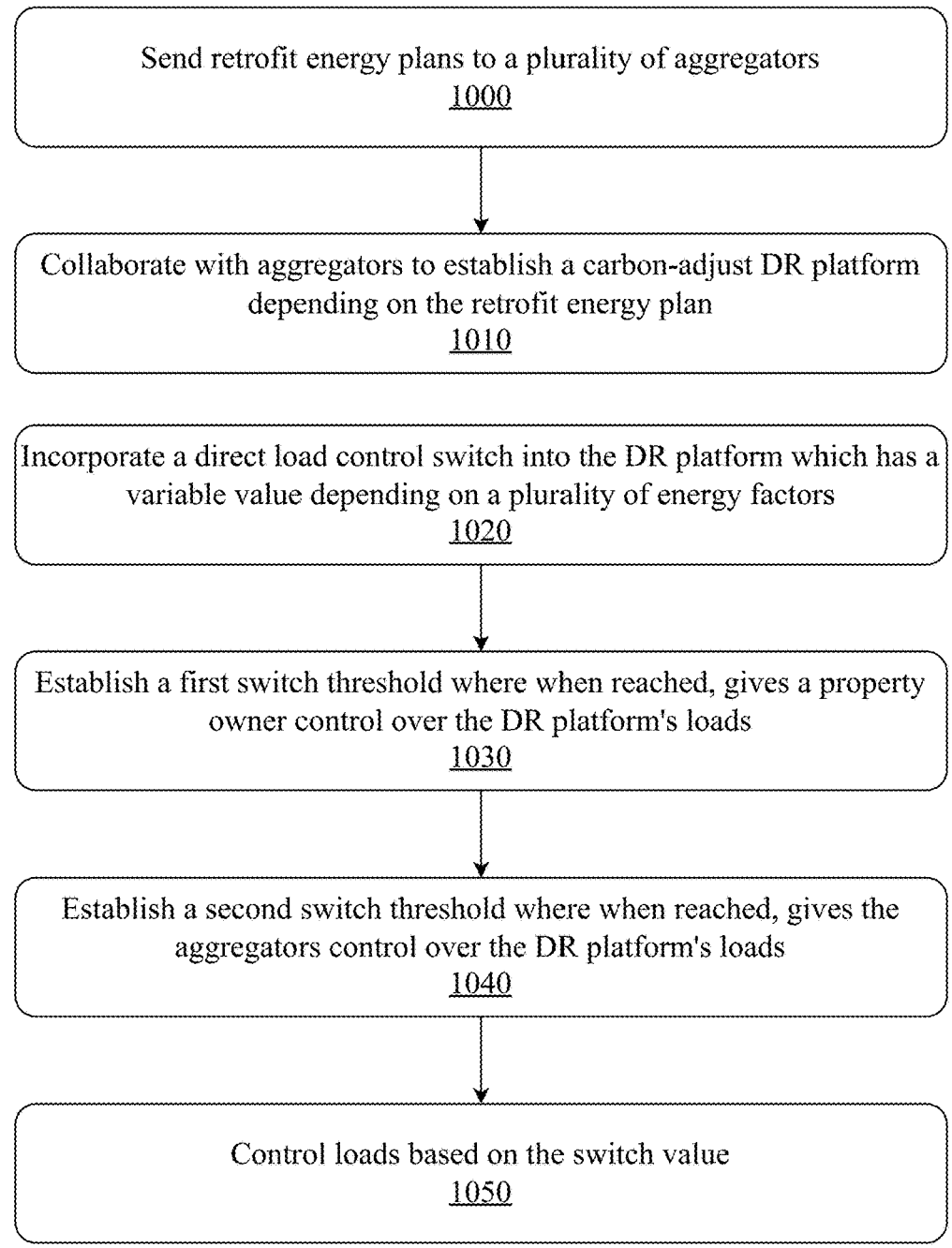
FIG. 10 is a flow diagram illustrating an exemplary method for controlling a DR platform's loads based on a switch value.

FIG. 10 is a flow diagram illustrating an exemplary method for controlling a DR platform's loads based on a switch value. In a first step 1000, send retrofit energy plans to a plurality of aggregators. The retrofit energy plans, generated by the machine learning energy optimizer, provide detailed recommendations for energy-efficient upgrades and operational improvements specific to each property. By sharing these plans with aggregators, the system enables a collaborative approach to energy management and carbon reduction.

In a step 1010, the method involves collaborating with aggregators to establish a carbon-adjust DR platform based on the retrofit energy plans. The carbon-adjust DR platform is a centralized system that facilitates the coordination and control of energy loads across multiple properties. It integrates the retrofit energy plans, real-time energy consumption data, grid carbon intensity, and market signals to optimize energy usage and maximize carbon credit generation. Aggregators bring expertise in energy market dynamics, demand response programs, and carbon credit monetization. They work closely with the system to design and implement effective DR strategies that align with the retrofit energy plans and the overall carbon reduction goals.

In a step 1020, incorporate a direct load control switch into the DR platform. The direct load control switch is a variable that determines the control authority over the energy loads connected to the DR platform. The value of the switch depends on a plurality of energy factors, such as real-time energy prices, grid stability, renewable energy availability, and carbon emission levels of the electricity grid. The switch may have a plurality of thresholds that govern the control of the DR platform's loads.

In a step 1030, a first switch threshold is set at a level that, when reached, gives property owners control over their energy loads. This threshold is designed to prioritize the comfort and preferences of property owners during normal operating conditions. When the switch value falls below this threshold, property owners have the flexibility to manage their energy consumption according to their needs.

In a step 1040, a second switch threshold is set at a level that, when reached, gives aggregators control over the DR platform's loads. This threshold is typically triggered during peak demand periods, grid emergencies, or when significant carbon reduction opportunities arise. When the switch value exceeds this threshold, aggregators have the authority to remotely control and optimize the energy loads across multiple properties to achieve system-wide benefits.

In a step 1050, the DR platform intelligently controls the connected energy loads based on the switch value. When the switch value is below the first threshold, property owners have control and can manually adjust their energy consumption. When the switch value is above the second threshold, aggregators take control and implement optimized load control strategies based on the retrofit energy plans and real-time conditions.

The direct load control switch acts as a dynamic balancing mechanism, ensuring that the carbon-adjust DR platform operates efficiently and responsively to changing energy and market conditions. It enables a flexible and collaborative approach to energy management, where property owners and aggregators work together to optimize energy usage, reduce carbon emissions, and generate carbon credits.

Aggregators benefit from the ability to pool and optimize energy loads across multiple properties, leveraging economies of scale and market insights to maximize carbon credit generation and monetization. The collaboration with property owners through the carbon-adjust DR platform enhances the effectiveness and reach of DR programs, contributing to grid stability and the integration of renewable energy sources.

The method can be further enhanced by incorporating advanced analytics, machine learning algorithms, and blockchain technologies to streamline the carbon credit verification and trading process. Continuous monitoring and analysis of energy consumption data, carbon emissions, and market trends enable the system to adapt and optimize its control strategies over time.

Exemplary Computing Environment

Figure 11:
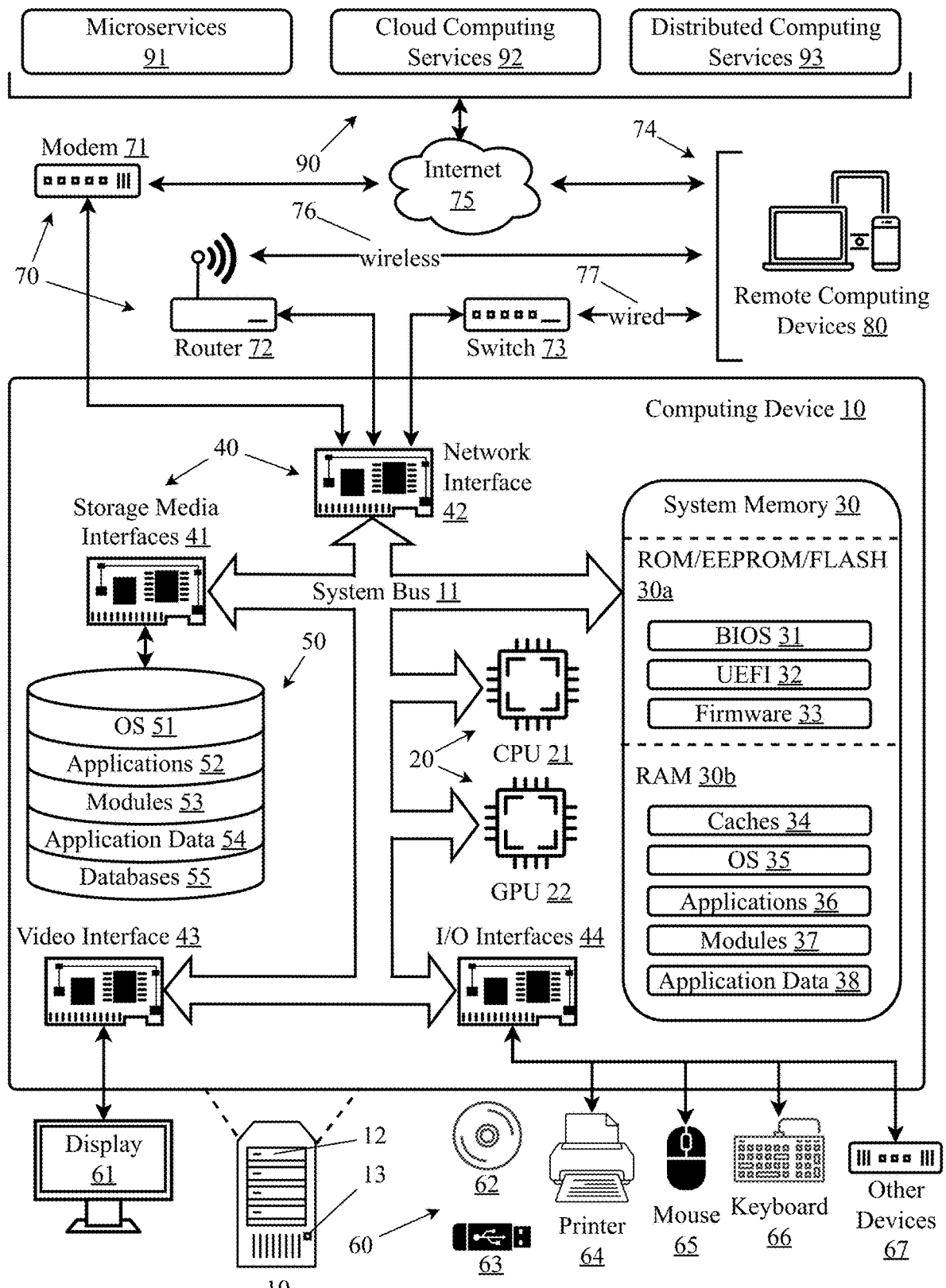
FIG. 11 illustrates an exemplary computing environment on which an embodiment described herein may be implemented, in full or in part.

FIG. 11 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI—O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks.

Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for an AI enhanced smart grid framework with optimized incentive capabilities, comprising:
    a computing device comprising at least a memory and a processor;
    a plurality of programming instructions that, when operating on the processor, cause the computing device to:
        collect a plurality of energy consumption data from a plurality of smart meters and Internet of Things (IoT) devices;
        train an artificial intelligence network using the plurality of energy consumption data, wherein the artificial intelligence network comprises a convolutional neural network (CNN) having:
        input layers that receive the energy consumption data;
        a plurality of convolutional layers that apply learnable filters to extract spatial dependencies in energy consumption patterns;
        pooling layers that downsample feature maps while retaining significant features; and
        fully connected layers that learn non-linear combinations of the extracted features;
        generate a plurality of tailored energy plans which are based on particular properties energy consumption using the artificial intelligence network, wherein each tailored energy plan includes specific retrofit recommendations and operational optimizations based on property-specific characteristics identified by the CNN;
        compute an optimized incentive based on the tailored energy plan using a trained interest optimizer, wherein the trained interest optimizer employs machine learning algorithms to calculate personalized interest rate incentives that balance financial risks and rewards between property owners and financing institutions; and implement the tailored energy plans through a dispatch network, wherein the dispatch network:
- identifies and prioritizes optimal dispatch times based on the tailored energy plans and a plurality of dispatch data;
- communicates with smart switches via a gateway to directly control energy-consuming devices according to the tailored energy plans; and
- dynamically adjusts control based on a direct load control variable that determines the authority to control energy loads based on grid conditions.

2. The system of claim 1, further comprising a homeowner profile network which receives a plurality of interest factors as inputs and uses a plurality of machine learning algorithms to create a plurality of property owner profiles.

3. The system of claim 2, further comprising a machine learning interest optimizer which receives the plurality of property owner profiles as an input and uses a plurality of machine learning algorithms to generate a suggested incentive program, wherein the suggested incentive program is tailored to each property owner based on their corresponding property owner profile.

4. A method for an AI enhanced smart grid framework with optimized incentive capabilities, comprising the steps of:

collecting a plurality of energy consumption data from a plurality of smart meters and Internet of Things (IoT) devices;

training an artificial intelligence network using the plurality of energy consumption data, wherein the artificial intelligence network comprises a convolutional neural network (CNN) having:
- input layers that receive the energy consumption data;
- a plurality of convolutional layers that apply learnable filters to extract spatial dependencies in energy consumption patterns;
- pooling layers that downsample feature maps while retaining significant features; and
- fully connected layers that learn non-linear combinations of the extracted features;

generating a plurality of tailored energy plans which are based on particular properties energy consumption using the artificial intelligence network, wherein each tailored energy plan includes specific retrofit recommendations and operational optimizations based on property-specific characteristics identified by the CNN;

computing an optimized incentive based on the tailored energy plan using a trained interest optimizer, wherein the trained interest optimizer employs machine learning algorithms to calculate personalized interest rate incentives that balance financial risks and rewards between property owners and financing institutions; and implementing the tailored energy plans through a dispatch network, wherein the dispatch network:
- identifies and prioritizes optimal dispatch times based on the tailored energy plans and a plurality of dispatch data;
- communicates with smart switches via a gateway to directly control energy-consuming devices according to the tailored energy plans; and
- dynamically adjusts control based on a direct load control variable that determines the authority to control energy loads based on grid conditions.

5. The method of claim 4, further comprising a homeowner profile network which receives a plurality of interest factors as inputs and uses a plurality of machine learning algorithms to create a plurality of property owner profiles.

6. The method of claim 5, further comprising a machine learning interest optimizer which receives the plurality of property owner profiles as an input and uses a plurality of machine learning algorithms to generate a suggested incentive program, wherein the suggested incentive program is tailored to each property owner based on their corresponding property owner profile.

* * * * *